(12) United States Patent
Niizato et al.

(10) Patent No.: US 6,254,352 B1
(45) Date of Patent: Jul. 3, 2001

(54) COMPRESSOR CONTROL SYSTEM FOR AIR CONDITIONER

(75) Inventors: Atsusi Niizato, Ashikaga; Kazuyoshi Suwa, Oota; Eiji Oohashi, Oizumi-machi, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/223,614

(22) Filed: Dec. 30, 1998

(30) Foreign Application Priority Data

Jan. 29, 1998 (JP) .................................................. 10-031984

(51) Int. Cl.[7] .................................................... F04B 49/06
(52) U.S. Cl. ......................................... 417/44.11; 318/374
(58) Field of Search .................................. 417/44.11, 45, 417/53; 318/374; 418/55.3; 340/825.63

(56) References Cited

U.S. PATENT DOCUMENTS

| 4,410,991 | * | 10/1983 | Lenart ..................................... 371/66 |
| 4,819,237 | * | 4/1989 | Hamilton et al. ....................... 271/66 |
| 5,006,045 | * | 4/1991 | Shimoda et al. ....................... 417/42 |
| 5,542,042 | * | 7/1996 | Manson .................................. 395/18 |
| 5,782,610 | * | 7/1998 | Ikeda ..................................... 417/53 |
| 5,820,349 | * | 10/1998 | Caillat ............................... 417/44.11 |
| 6,005,489 | * | 12/1999 | Siegle et al. ..................... 340/825.69 |

* cited by examiner

*Primary Examiner*—Henry C. Yuen
*Assistant Examiner*—Mahmoud Gimie
(74) *Attorney, Agent, or Firm*—Darby & Darby

(57) ABSTRACT

A compressor control system including a controller for controlling the operation of a compressor, a power source unit for supplying power to the compressor, and a power converting device for subjecting the power from the power source unit to conversion processing and then supplying the power thus converted to the controller, the controller being reset on the basis of input of a reset signal to stop said compressor, is further provided with a power monitoring device for monitoring a power state (e.g., power failure or not) of the power source unit, and outputting the reset signal to the controller when the power supply of the power source unit is intercepted.

14 Claims, 4 Drawing Sheets

COMPRESSOR CONTROL SYSTEM FOR AIR CONDITIONER

BACKGROUND OF TH INVENTION

1. Field of the Invention

The present invention relates to a compressor control system for an air conditioner, and particularly to a compressor control system for an air conditioner which improves the control of the operation of a rotary type compressor.

2. Description of the Related Art

According to most of generally-known air conditioners, air cooling/heating operation is carried out through a refrigeration cycle in which refrigerant alternately repeats condensation and evaporation, and in this refrigeration cycle the refrigerant is subjected to a high-temperature and high-pressure process and also compressed so that the refrigerant is provided with circulating power. A rotary or scroll type compressor is more frequently used to compress the refrigerant, and an induction motor or a DC motor is also more frequently used as an electric motor for these types of compressors. As one of these compressors is known a rotary type compressor 1 containing a single-phase induction motor which is driven by single-phase power as shown in FIG. 1.

According to the induction motor, voltage is applied to plural coils while varying the phase of the voltage among the coils, thereby generating a rotating magnetic field, and a rotator is driven by the rotating magnetic field thus generated. In the case of the single-phase induction motor, the phase of the power source is single, and thus the voltage of the power source is applied to a primary coil while a voltage which is advanced in phase by inserting a capacitor in series is applied to an auxiliary coil, thereby generating a rotating magnetic field. This type of induction electric motor is known as a capacitor run motor type, and it is frequently used. The rotating magnetic field generated by the above capacitor run motor is more unstable than that generated by a three-phase induction motor based on a three-phase alternating power source, and the rotational force induced is more inhomogeneous.

The single-phase induction electric motor will be described in more detail with reference to FIG. 1.

The single-phase induction motor of the compressor 1 is supplied with an alternating voltage of about 200 V from a power source unit 2. The operation (start, stop) of the compressor 1 is controlled on the basis of an operating signal from a controller 3. The controller 3 controls not only the compressor 1, but also the other parts of an air conditioner.

The voltage from the power source unit 2 is stabilized by a power converting device 4 comprising a transformer 5, a rectifying/smoothening circuit 6 and a voltage regulating circuit (constant-voltage circuit) 7, and the voltage thus stabilized is finally applied to the controller 3. When the voltage supply from the power source unit 2 is interrupted due to a power failure, a reset signal is output from the voltage regulating circuit 7 of the power converting device 4 to the controller 3 to reset the controller 3, whereby an operating signal output from the controller 3 to the compressor 1 is extinguished. The operating signal is used to actuate the compressor 1.

However, since an electrolytic capacitor is used for the rectifying/smoothening circuit 6 of the power converting device 4, the voltage supply from the voltage regulating circuit 7 to the controller 3 is continued for several hundreds msec from the occurrence of the power failure. Therefore, no reset signal is output from the voltage regulating circuit 7 to the controller 3, so that the controller 3 continues to operate and output the operating signal to the compressor 1. That is, the compressor 1 continues to rotate for the above time period.

Furthermore, the power supply from the power source unit 2 to the compressor 1 is interrupted simultaneously with the occurrence of the power failure, and a roller 8A of the compressor 1 continues to rotate in a normal direction A by the inertial force and finally stops as shown in FIG. 2. When the power failure occurs in the process of compressing refrigerant, the compressed refrigerant applies its repulsive force acting in the opposite (reverse) direction B to the normal direction to the roller 8A of the compressor 1 under the compression process indicated by a two-dotted chain line of FIG. 2.

In FIG. 2, reference numeral 8B represents a cylinder, reference numeral 8C represents a vane, and reference numerals 8D and 8E represent a suction port and a discharge port provided to the cylinder 8B.

In the case of a long-term (several hundreds msec or more) power failure, when the compressor 1 is in the refrigerant compressing process at the time of occurrence of the power failure, with the repulsive force induced by the compressed refrigerant, the compressor 1 starts to rotate in the reverse direction due to the interruption of the power supply to the compressor 1. However, during the long-term power failure, the voltage supply from the voltage regulating circuit 7 to the controller 3 is interrupted, and thus the reset signal is output from the voltage regulating circuit 7 to the controller 3 to reset the controller 3, so that the operating signal from the controller 3 to the compressor 1 is extinguished. Therefore, the reverse rotation of the compressor 1 is stopped.

On the other hand, in the case of a short-term (from several tens (about 40) msec to several hundreds msec or less) power failure, when the compressor 1 is in the refrigerant-compressing process at the time of occurrence of the power failure, the repulsive force induced by the compressed refrigerant causes the compressor 1 to start rotating in the reverse direction, however, the voltage supply from the voltage regulating circuit 7 to the controller 3 still continues during this power failure, so that no reset signal is output from the voltage regulating circuit 7 to the controller 3, so that the controller 3 continues to output the operating signal to the compressor 1. Accordingly, when the power is restored after the short-term power failure, the single-phase induction motor of the compressor 1 generates unstable rotational magnetic field, and the rotational force in the normal direction is weak, so that the compressor 1 continues to rotate in the reverse direction.

The reverse rotation of the compressor 1 causes increase of the pressure in the compressor 1 and heating, and lubricant oil in the compressor 1 is deteriorated, finally resulting in failure of the compressor 1.

Usually, the compressor 1 is provided with a device for monitoring the pressure at the exit thereof or the operation current thereof to prevent the failure of the compressor 1. In the reverse rotation state of the compressor, there is little variation from the normal state in the pressure at the exit and the operation current, so that the reverse rotation phenomenon cannot be detected by using the monitoring device described above. Further, even when a thermostat for detecting the increase of temperature or the like is provided to the coil of the electric motor of the compressor, it takes long time until the temperature of the coil increases to a temperature at which the thermostat operates, and thus the compressor 1 may fail due to the reverse rotation of the compressor 1.

Besides, when the reset signal is output from the voltage regulating circuit 7 of the power converting device 4 to the controller 3, depending on the power occurrence manner of the power source unit 2, some dispersion may occur in reset time in which the reset of the controller 3 is completed, and particularly when the voltage of the power source unit 2 is reduced, the voltage regulating circuit 7 may erroneously output a reset signal to the controller 3.

SUMMARY OF THE INVENTION

The present invention has been implemented in view of the foregoing situation, and has an object to provide a compressor control system for an air conditioner which can surely prevent the reverse rotation phenomenon of a compressor when a power failure occurs.

In order to attain the above object, a compressor control system according to the present invention which includes a controller for controlling the operation of a compressor, a power source unit for supplying power to the compressor, and a power converting device for subjecting the power from the power source unit to conversion processing and then supplying the power thus converted to the controller, the controller being reset on the basis of input of a reset signal to stop the compressor, is characterized by further including a power monitoring device for monitoring a power state of the power source unit, and outputting the reset signal to the controller when the power supply of the power source unit is intercepted.

According to the above-described compressor control system, the power monitoring device outputs the reset signal to the controller at the interception time of the power of the power source unit, and the controller is reset on the basis of the reset signal to stop the compressor. Therefore, when the electric motor of the compressor is a single-phase induction motor, the compressor is in the refrigerant-compressing process at the interception time of the power, and thus even when the compressor is about to be reversely rotated by the repulsive force of the compressed refrigerant due to the power interception, the controller to which the power is continued to be supplied from the power converting device is reset to stop the compressor, so that the reverse rotation phenomenon of the compressor can be surely prevented.

Further, the power monitoring device monitors the power state of the power source unit, and outputs the reset signal to the controller at the interruption time of the power, so that no reset signal is output to the controller when the voltage of the power source unit is instantaneously reduced. Accordingly, when the voltage of the power source unit is instantaneously reduced, the control device is not reset and thus the compressor is not stopped. Therefore, the malfunction of the compressor can be avoided, and the operation of the air conditioner can be performed with high reliability.

In the above-described compressor control system, the power monitoring device may output the reset signal after a fixed time elapses from the interruption of the power supply of the power source unit.

According to the above-described compressor control system, the following effect can be achieved.

The power monitoring device outputs the reset signal to the controller after a fixed time elapses from the interruption of the power of the power source unit, and thus if the fixed time is set to such a time that when the power interruption occurs in the compression process during which the compressor compresses refrigerant, the compressor is not reversely rotated even by the repulsive force of the compressed refrigerant, the controller is reset and thus the compressor is stopped in the case of a short-term power failure in which the power interruption state continues even after a fixed time elapses from the interruption of the power although the compressor starts to rotate in the reverse direction. Therefore, the reverse phenomenon of the compressor can be surely prevented.

On the other hand, in the case of a short-term power failure in which the power interruption state is finished before a fixed time elapses from the power interruption, no reset signal is output from the power monitoring device to the controller, and the compressor does not start to rotate in the reverse direction during this time, so that the compressor an be continued to rotate in the normal direction even after the extremely-short-term power failure is finished, and thus the reduction of the operation performance of the air conditioner is not induced.

DETAILED DESCRIPTION OF THE PREFERRED EMBODIMENTS

A preferred embodiment according to the present invention will be described hereunder with reference to the accompanying drawings.

Figure 3:
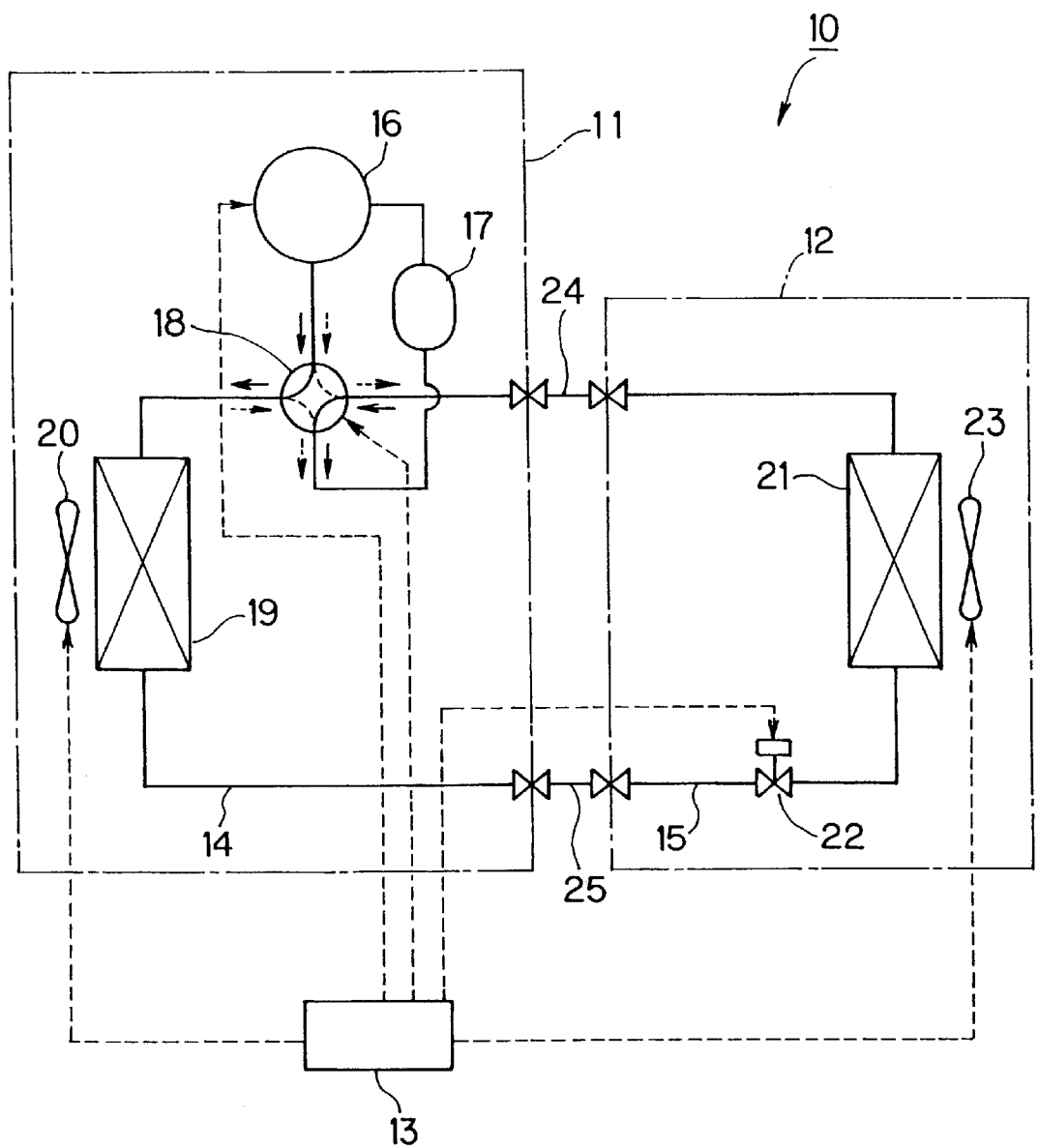
FIG. 3 is a diagram showing a refrigerant circuit of an air conditioner containing a compressor of FIG. 4.

FIG. 3 is a diagram showing a refrigerant circuit of an air conditioner.

As shown in FIG. 3, an air conditioner 10 includes an outdoor unit 11, an indoor unit 12 and a controller 13, and an outdoor refrigerant pipe 14 of the outdoor unit 11 and an indoor refrigerant pipe 15 of the indoor unit 12 are linked to each other through link pipes 24 and 25.

The outdoor unit 11 is disposed outdoors, and the compressor 16 is disposed in the outdoor refrigerant pipe 14. An accumulator 17 is connected to the suction side of the compressor 16 through the outdoor refrigerant pipe 14, a four-way change-over valve 18 is connected to the discharge side of the compressor 16 through the outdoor refrigerant pipe 14, and an outdoor heat-exchanger 19 is connected to the four-way change-over valve 18 through the outdoor refrigerant pipe 14. An outdoor fan 20 for blowing air to the outdoor heat-exchanger 19 is disposed in the vicinity of the outdoor heat-exchanger 19.

Further, the indoor unit 12 is disposed indoors, an indoor heat-exchanger 21 is disposed in the indoor refrigerant pipe 15, and an electric expansion valve 22 is disposed in the neighborhood of the indoor heat-exchanger 21 in the indoor refrigerant pipe 15. An indoor fan 23 for blowing air to the indoor heat-exchanger 21 is disposed in the neighborhood of the indoor heat-exchanger 21.

The controller 13 controls the operation of the outdoor unit 11 and the indoor unit 12, and more specifically, the controller 13 controls the compressor 16, the four-way change-over valve 18 and the outdoor fan 20 of the outdoor unit 11, and the electric expansion valve 22 and the indoor fan 23 of the indoor unit 12.

The controller 13 controls the switching operation of the four-way change-over valve 18 to set the operation of the air conditioner 10 to one of cooling operation and heating operation. That is, when the controller 13 switches the four-way change-over valve 18 to the cooling operation side, refrigerant flows as indicated by solid-line arrows. In this case, the outdoor heat-exchanger 19 serves as a condenser while the indoor heat-exchanger 21 serves as an evaporator, whereby the operation state of the air conditioner is set to the cooling operation state, and the indoor heat-exchanger 21 of the indoor unit 12 cools the room. On the other hand, when the controller 13 switches the four-way change-over valve 18 to the heating operation side, the refrigerant flows as indicated by broken-line arrows. In this case, the indoor heat-exchanger 21 serves as a condenser while the outdoor heat-exchanger 19 serves as an evaporator, whereby the operation state of the air conditioner is set to the heating operation state, and the indoor heat-exchanger 21 of the indoor unit 12 heats the room.

In accordance with the air conditioning load of the indoor unit 12, the controller 13 also controls the opening degree of the electric expansion valve 22 of the indoor unit 12, and controls the fan driving system of the indoor fan 23 in the indoor unit 12.

Figure 4:
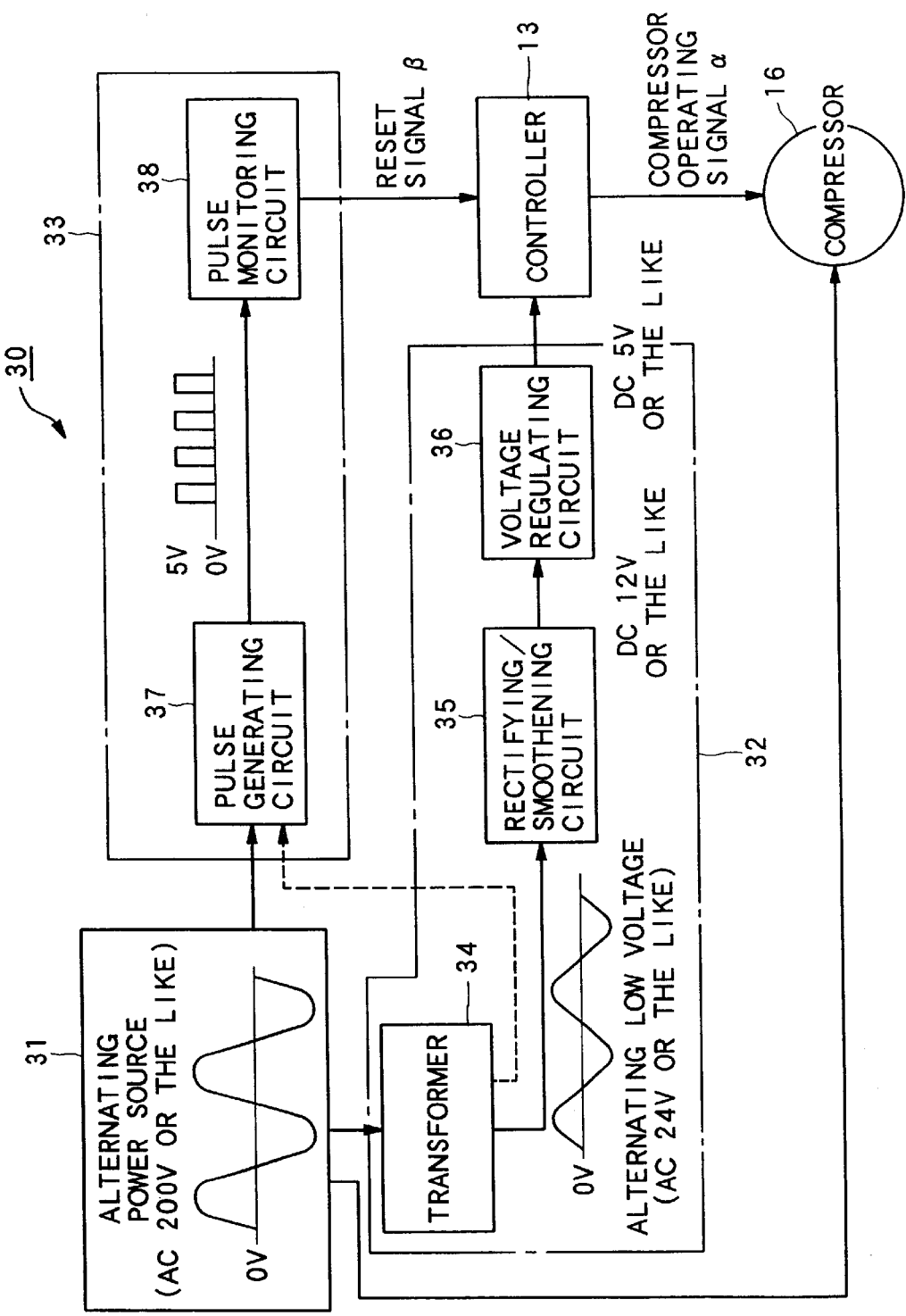
FIG. 4 is a block diagram showing an embodiment of a compressor control system for an air conditioner according to the present invention.

The operation control of the compressor 16 by the controller 13 is performed by using a compressor control system 30 shown in FIG. 4, and the compressor control system 30 is constructed by not only the controller 13, but also a power source unit 31, a power converting device 32 and a power monitoring device 33.

Here, the compressor 16 provides a circulating force to the refrigerant which alternately repeats condensation and compression in a refrigerant circuit, and exposes the refrigerant to a high-temperature and high-pressure process. In this embodiment, a rotary type compressor is used as the compressor 16. As described above, the rotary type compressor and the scroll type compressor suffer a repulsive force acting in the opposite direction (reverse direction) to the normal direction from the compressed refrigerant as described above.

As in the case of the prior art, a single-phase induction motor is used as an electric motor for the compressor 16. Although the single-phase induction motor generates more unstable rotational magnetic field as compared with a three-phase induction motor and the rotational force is inhomogeneous, it has advantages that it has a simple construction and it is designed at a low cost.

The power source unit 31 is used to supply operating power to the air conditioner 10. It directly supplies power to the compressor 16, the outdoor fan 20, the four-way change-over valve 18 and the indoor fan 23, and also supplies converted power through the power converting device 32 to the controller 13 and the electric expansion valve 22. The voltage supplied from the power source unit 31 is set to 200 V±10% in Japan, however, this voltage is not limited to the above range in the case of an independent electric power plant or overseas.

The power converting device 32 converts the alternating power of the power source unit 31 to DC power, stabilizes the voltage thus converted, and then supplies the DC power thus converted to parts driven by the DC power such as the controller 13, the electric expansion valve 22, etc. The power converting device 32 is constructed by a transformer 34, a rectifying/smoothening circuit 35 and a voltage regulating (constant-voltage) circuit 36, however, a switching power source having the same function as these parts may be used.

The transformer 34 transforms alternating power (voltage) of about 200 V of the power source unit 31 to low voltage power of about 24 V. The rectifying/smoothening circuit 35 conducts full wave rectification on the low voltage alternating power from the transformer 34 through a bridge diode or the like, and then smoothens the rectified power through an electrolytic capacitor to obtain DC power of 12 V. Thereafter, the voltage regulating circuit 36 stabilizes the DC power from the rectifying/smoothening circuit 35 through a power regulator or the like, and then sets it to low voltage DC power of about 5 V.

As shown in FIG. 3, the controller 13 controls the compressor 16, the four-way change-over valve 18, the outdoor fan 20, the electric expansion valve 22 and the indoor fan 23 to control the overall air conditioner 10 as described above. Particularly for the compressor 16, an operating signal $\alpha$ shown in FIG. 4 is output to a relay (not shown) or the like, and the compressor 16 is started or stopped by actuating the relay or the like, thereby controlling the operation (start, stop) of the compressor 16.

The controller 13 includes a microcomputer, and it is necessary to reset the microcomputer of the controller 13 for a predetermined time after the power source is turned on because the microcomputer is often unstable at the time of power-on. The reset of the microcomputer of the controller 13 is carried out by inputting a reset signal $\beta$ (high-level voltage or low-level voltage) to a reset port (not shown). When the controller 13 is reset as described above, the operating signal $\alpha$ to the compressor 16 is extinguished and the compressor 16 is stopped. The other parts such as the four-way change-over valve 18, the outdoor fan 20, the electric expansion valve 22 and the indoor fan 23 are stopped in the same manner as described above.

The power monitoring device 33 monitors the power state of the power source unit 31, and outputs the reset signal $\beta$ to the controller 13 at the interruption time of the power of the power source unit 31 (that is, at the time of occurrence of power failure), and it comprises a pulse generating circuit 37 and a pulse monitoring circuit 38.

The pulse generating circuit 37 generates pulses which are synchronized with the frequency of the power (voltage) of the power source unit 31, and for example pulses whose period is equal to a half of the frequency of the power (voltage) of the power source unit 31 are generated by using a photocoupler, for example. At the time of the power failure, the power supply of the power source unit 31 is interrupted, and the supply of the pulse signals from the pulse generating circuit 37 is also stopped.

The pulse monitoring circuit 38 monitors the pulses generated from the pulse generating circuit 37 to monitor the power state of the power source unit 31. The pulse monitoring circuit 38 contains a timer for counting a fixed time, and outputs the reset signal $\beta$ to the controller 13 after the fixed time elapses from the time when no pulse is generated from the pulse generating circuit 37 due to the power failure (for example, after several tens (about 40) msec elapse from the occurrence of the power failure). Alternatively, the reset signal can be generated as soon as the pulses terminate.

Figure 1:
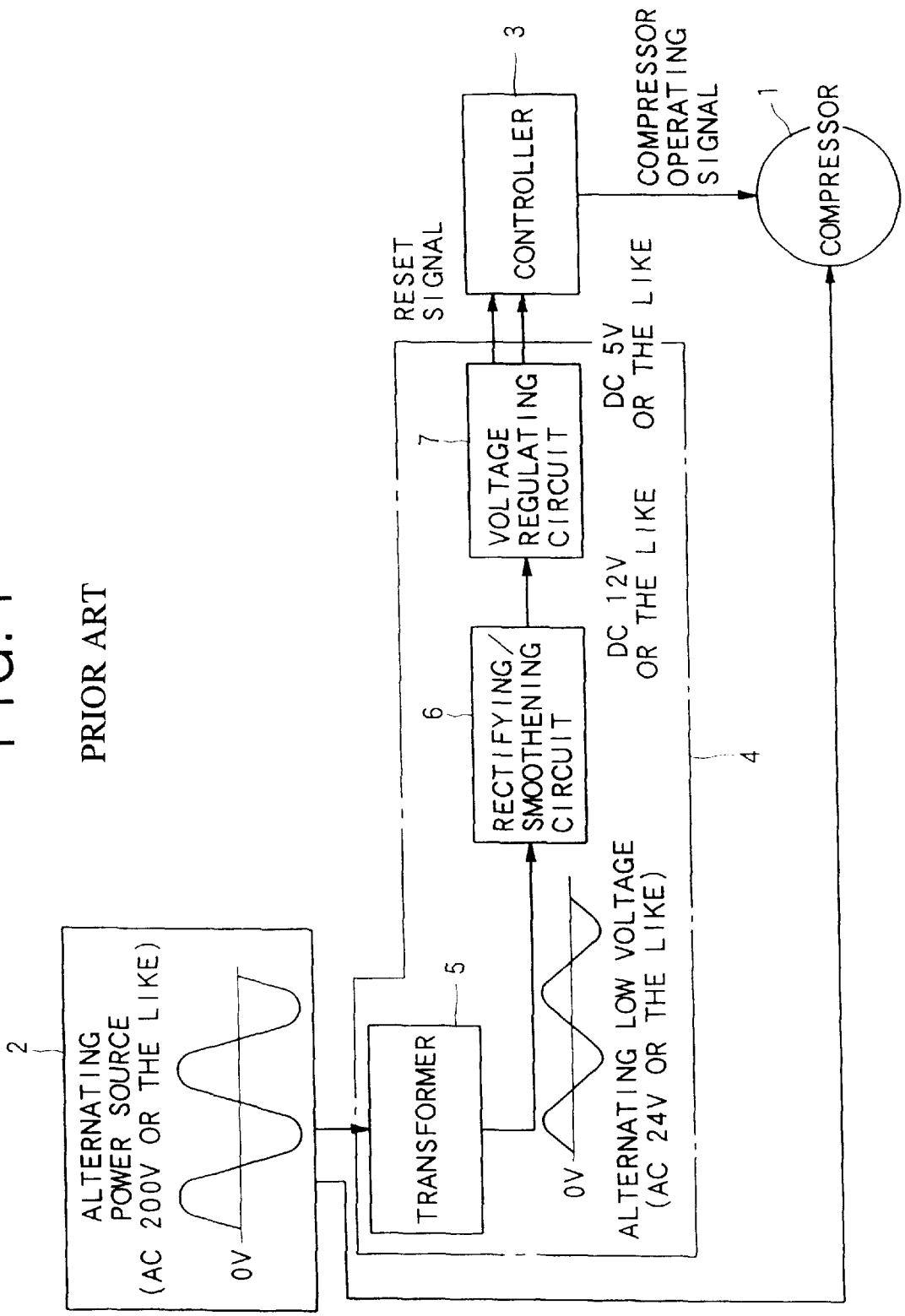
FIG. 1 is a block diagram showing a conventional compressor control system for an air conditioner.
Figure 2:
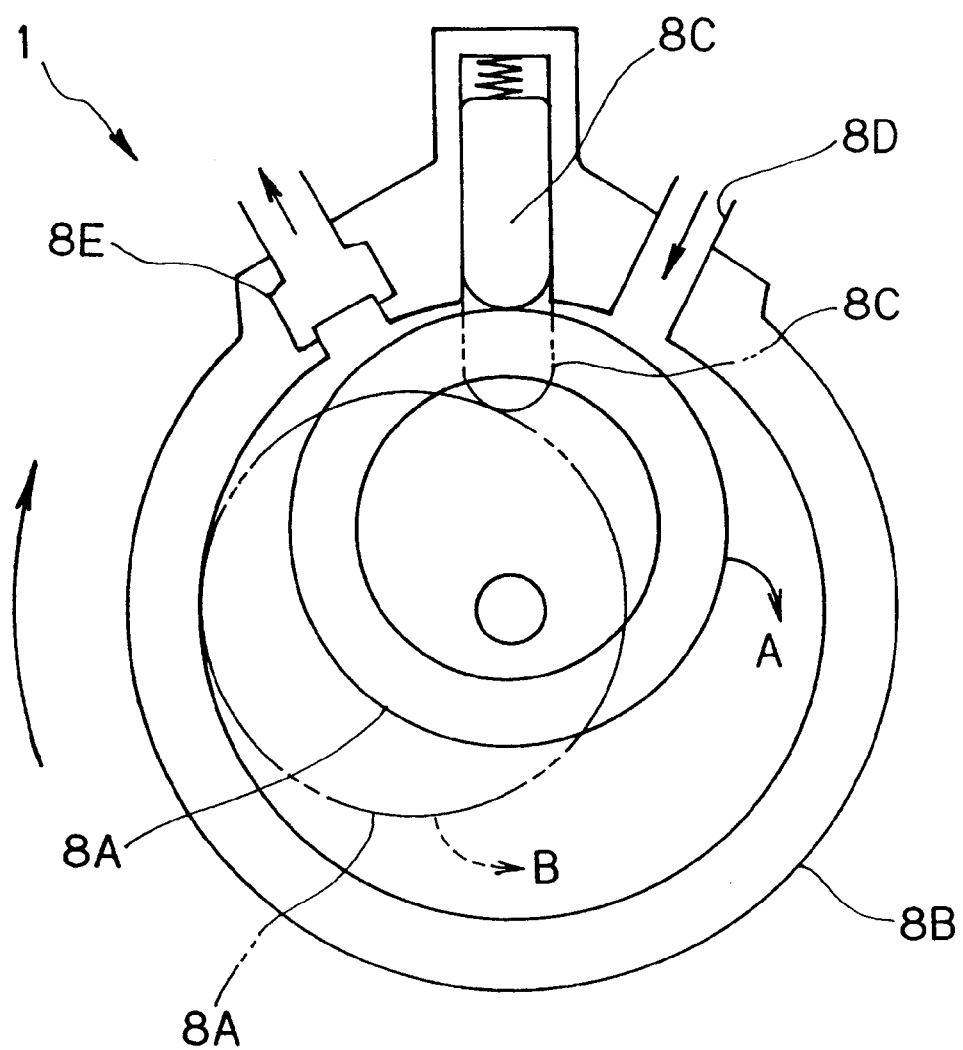
FIG. 2 is a plan cross-sectional view showing a cylinder portion of a compressor.

The fixed time counted after the occurrence of the power failure is set to such a time that when the power failure occurs in the refrigerant compressing process of the compressor, the compressed refrigerant applies its repulsive force acting in the opposition (reverse) direction to the roller (see reference numeral 8A of FIG. 2) which rotates in the forward direction by the action of the inertial force, however, the roller of the compressor 16 does not start to rotate in the reverse direction by even the repulsive force because the inertial force exceeds the repulsive force at this time. After the fixed time elapses, the roller of the compressor 16 starts to rotate in the reverse direction with the repulsive force.

The pulse monitoring circuit 38 continues to output the reset signal β to the controller 13 until a predetermined time elapses from the time when the power of the power source unit 31 is restored and the power source unit 31 starts to generate pulses, and stops the output of the reset signal β to actuate the controller 13 at the stage that the inside of the computer of the controller 13 is stabilized (after the predetermined time elapses).

Next, the control of the operation of the compressor control system 30 at the power-failure time will be described in each of the following three cases: a long-term power-failure case (power failure for several hundreds msec or more), a short-term power-failure case (power failure for several tens (about 40) msec to several hundred msec) and an extremely-short-term power-failure case (power failure for several tens (about 40) msec or less).

(1) Long-term Power Failure (Power Failure for several hundreds msec or more)

The power supply from the power source unit 31 to the compressor 16 is interrupted simultaneously with occurrence of a power failure, and when the power failure occurs during the refrigerant-compressing process, the compressor suffers the repulsive force of the compressed refrigerant in the opposite direction to the forward rotational direction and thus it rotates in the reverse direction. During the long-term power failure, the pulse monitoring circuit 38 of the power monitoring device 33 outputs the reset signal β to the controller 13 after the fixed time elapses (several tens (about 40) msec elapses) from the occurrence of the power failure, and the controller 13 is reset. The resetting of the controller 13 extinguishes the operating signal α output from the controller 13 to the compressor 16. Accordingly, no operating signal α is output from the controller 13 to the compressor 16, so that the compressor 16 does not continue to rotate in the reverse direction and finally stops.

During the long-term power failure, the power supplied from the voltage regulating circuit 36 of the power converting device 32 to the controller 13 is intercepted after several hundreds msec elapse from the occurrence of the power failure.

(2) Short-term Power Failure (Power Failure for several tens (about 40) msec to several hundreds sec)

As in the case of the above long-term power failure, the power to be supplied from the power source unit 31 to the compressor 16 is interrupted simultaneously with the occurrence of the power failure occurs. When the power failure occurs in the refrigerant-compressing process of the compressor, the compressor suffers the repulsive force of the compressed refrigerant in the reverse direction to the normal rotational direction, and starts to rotate in the reverse direction. Further, during the short-term power failure, the power supply from the voltage regulating circuit 36 of the power converting device 32 to the controller 13 is continued. However, the pulse monitoring circuit 38 of the power monitoring device 33 outputs the reset signal β to the controller 13 after a fixed time (several tens (about 40) msec) elapses from the occurrence of the power failure, and resets the controller 13, whereby the operating signal α output from the controller 13 to the compressor 16 is extinguished. Accordingly, in this case, the reverse rotation of the compressor 16 is also stopped without being continued.

(3) Extremely-short-term Power Failure (Power Failure for several tens (about 40) msec or less)

In this case, the power supply from the power source unit 31 to the compressor 16 is intercepted at the same time when the power failure occurs. When the power failure occurs in the refrigerant-compressing process, the compressor suffers the repulsive force of the compressed refrigerant in the reverse direction to the normal rotational direction, however, it is still under the state before it starts to rotate and rotates in the normal direction by the inertial force. During this extremely-short-term power failure, the power is supplied from the voltage regulating circuit 36 of the power converting device 32 to the controller 13, and also no reset signal is output from the pulse monitoring circuit 38 of the power monitoring device 33 to the controller 13, so that the controller 13 is under operation. Accordingly, when the power from the power source unit 31 is restored from the above state, the rotational force of the compressor 16 in the same normal direction as before the power failure is increased, and the air conditioner 10 continues the operation before the power failure (cooling operation or heating operation).

With the above construction, the compressor control system 30 of the air conditioner 10 has the following effects (1) to (3).

(1) The power monitoring device 33 outputs the reset signal β to the controller 13 in the long-term or short-term power failure of the power source unit 31, and the controller 13 is reset by the reset signal β to stop the compressor 16. Therefore, in the case where the electric motor of the compressor 16 is a single-phase induction motor, the controller 13 to which the power is continued to be supplied from the voltage regulating circuit 36 of the power converting device 32 (in the case of the short-term power failure) is forcedly reset to stop the compressor 16 even when the compressor 16 is in the refrigerant-compressing process at the time of the occurrence of the long-term or short-term power failure and thus the compressor 16 is forced to be rotated in the reverse direction by the repulsive force of the compressed refrigerant. Therefore, the reverse rotation phenomenon of the compressor can be surely prevented.

(2) The power monitoring device 33 monitors the power state of the power source unit 31 with the pulses generated in the pulse generating circuit 37, and outputs the reset signal β to the controller 13 when the power is interrupted (in the case of the long-term or short-term power failure). Therefore, when the voltage of the power source unit 31 is instantaneously reduced, no reset signal β is output to the controller 13. Accordingly, it is avoided that the controller 13 is reset and the compressor is stopped when the voltage of the power source unit is instantaneously reduced. Therefore, the misoperation of the compressor 16 can be avoided, and the reliability of the operation of the air conditioner 10 can be ensured.

(3) The power monitoring device 33 outputs the reset signal β to the controller 13 after a fixed time elapses from the interruption of the power of the power source unit 31 (occurrence of a power failure), and the fixed time is set to such a time that when the power failure occurs in the refrigerant-compressing process of the compressor 16, the compressor does not start to rotate in the reverse direction by even the repulsive force of the compressed refrigerant. Therefore, in the short-term power failure in which the power interruption state is continued even when the fixed time elapses from the occurrence of the power failure, the compressor starts to rotate in the reverse direction, however, the controller 13 is reset and thus no operating signal α is output to the compressor 16, so that the reverse phenomenon of the compressor 16 can be surely prevented.

On the other hand, in the extremely-short-term power failure in which the power interruption state is finished before the fixed time elapses from the occurrence of the power failure, no reset signal β is output from the pulse monitoring circuit 38 of the power monitoring device 33 to the controller 13, and the compressor 16 does not start to rotate in the reverse direction during this period. Therefore, the compressor 16 is continued to rotated in the normal direction even after the extremely-short-term power failure is finished, so that the operation performance of the air conditioner 10 can be prevented from being lowered.

The present invention is not limited to the above embodiment, and various modifications may be made without departing from the subject of the present invention.

For example, in the above embodiment, the pulse generating circuit 37 of the power monitoring device 33 generates the pulses on the basis of the power of the power source unit 31. However, the pulses may be generated on the basis of the power of the transformer 34 of the power converting device 32. Further, the power monitoring device 33 may directly monitor the variation of the voltage of the power source unit without transforming the power of the power source unit 31 or the transformer 34 to pulses.

According to the compressor control system for the air conditioner according to the present invention, the power monitoring device monitors the power state of the power source unit, and outputs the reset signal to the controller for controlling the operation of the compressor when the power supply of the power source unit is intercepted. The controller is reset by the reset signal to stop the compressor. Therefore, even when the power failure occurs in the refrigerant-compressing process of the compressor, the reverse rotation phenomenon of the compressor can be surely prevented.

What is claimed is:

1. A compressor control system including a controller for controlling the operation of a compressor, a power source unit for supplying power to said compressor, a power converting device for subjecting the power from said power source unit to conversion processing and then supplying the power thus converted to said controller, said controller being reset on the basis of input of a reset signal to stop said compressor, characterized by further including:

a power monitoring device for monitoring a power state of said power source unit, and outputting the reset signal to said controller when the power supply of said power source unit is interrupted, said power monitoring device outputting the reset signal after a predetermined fixed time elapses from the interruption of the power supply of said power source unit.

2. The compressor control system as claimed in claim 1, wherein the interruption of the power supply is caused by a power failure.

3. A compressor control system including a controller for controlling the operation of a compressor, a power source unit for supplying power to said compressor, a power converting device for subjecting the power from said power source unit to conversion processing and then suppling the power thus converted to said controller, said controller being reset on the basis of input of a reset signal to stop said compressor, characterized by further including:

a power monitoring device for monitoring a power state of said power source unit, and outputting the reset signal to said controller when the power supply of said power source unit is interrupted, said power monitoring device outputting the reset signal after a predetermined fixed time elapses from the interruption of the power supply of said power source unit wherein said predetermined fixed time is set to such a time that when the power interruption occurs in a refrigerant-compressing process of said compressor, said compressor is not reversely rotated by the repulsive force of the compressed refrigerant because the inertial force of said compressor exceeds the repulsive source of the compressed refrigerant.

4. The compressor control system as claimed in claim 3, wherein the predetermined fixed time is set to several tens msec.

5. The compressor control system as claimed in claim 4, wherein the predetermined fixed time is set to about 40 msec.

6. A compressor control system including a controller for controlling the operation of a compressor, a power source unit for supplying power to said compressor, a power converting device for subjecting the power from said power source unit to conversion processing and then supplying the power thus converted to said controller, said controller being reset on the basis of input of a reset signal to stop said compressor, characterized by further including:

a power monitoring device for monitoring a power state of said power source unit, and outputting the reset signal to said controller when the power supply of said power source unit is interrupted, said power monitoring device comprising a pulse generating circuit for generating pulses which are synchronized with the frequency of a power of said power source unit, the supply of the pulses from said power generating circuit being stopped when the power supply of said power source unit is interrupted, and a pulse monitoring circuit for monitoring the pulses generated from said pulse generating circuit to monitor the power state of said power source unit.

7. The compressor control system as claimed in claim 6, wherein said pulse monitoring circuit contains a timer for counting the predetermined fixed time, and outputs the reset signal to said controller after the fixed time elapses from the time when no pulse is generated from said pulse generating circuit, thereby stopping said compressor.

8. A compressor control system including a controller for controlling the operation of a compressor, a power source unit for supplying power to said compressor, a power converting device for subjecting the power from said power source unit to conversion processing and then supplying the power thus converted to said controller, said controller being reset on the basis of input of a reset signal to stop said compressor, characterized by further including:

a power monitoring device for monitoring a power state of said power source unit, and outputting the reset signal to said controller when the power supply of said power source unit is interrupted, said power monitoring device comprising a pulse generating circuit for generating pulses which are synchronized with the frequency of the power of said power source unit, the supply of the pulses from said pulse generating circuit being stopped when the power supply of said power source unit is interrupted, and a pulse monitoring circuit for monitoring the pulses generated from said pulse generating circuit to monitor the power state of said power source unit, wherein said power monitoring device outputs the reset signal after a predetermined fixed time elapses from the interruption of the power supply of said power source unit.

9. The compressor control system as claimed in claim 8, wherein said pulse monitoring circuit contains a timer for counting the predetermined fixed time, and outputs the reset signal to said controller after the fixed time elapses from the time when no pulse is generated from said pulse generating circuit, thereby stopping said compressor.

10. The compressor control system as claimed in claim 8, wherein the interruption of the power supply is caused by a power failure.

11. A compressor control system including a controller for controlling the operation of a compressor, a power source unit for supplying power to said compressor, a power converting device for subjecting the power from said power source unit to conversion processing and then supplying the power thus converted to said controller, said controller being reset on the basis of input of a reset signal to stop said compressor, characterized by further including:

a power monitoring device for monitoring a power state of said power source unit, and outputting the reset signal to said controller when the power supply of said power source unit is interrupted, wherein said power monitoring device outputs the reset signal after a predetermined fixed time elapses from the interruption of the power supply of said power source unit, said predetermined fixed time being set to such a time that when the power interruption occurs in a refrigerant-compressing process of said compressor, said compressor is not reversely rotated by the repulsive force of the compressed refrigerant because the inertial force of said compressor exceeds the repulsive force of the compressed refrigerant.

12. The compressor control system as claimed in claim 11, wherein the predetermined fixed time is set to several tens of milliseconds.

13. The compressor control system as claimed in claim 12, wherein the predetermined fixed time is set to about 40 milliseconds.

14. A compressor control system including a controller for controlling the operation of a compressor, a power source unit for supplying power to said compressor, a power converting device for subjecting the power from said power source unit to conversion processing and then supplying the power thus converted to said controller, said controller being reset on the basis of input of a reset signal to stop said compressor, characterized by further including:

a power monitoring device for monitoring a power state of said power source unit, said power monitoring device comprising a pulse generator for generating a pulse signal synchronized to the frequency of the power source, and monitor means for outputting the reset signal to said controller in the absence of said pulse signals.

* * * * *

UNITED STATES PATENT AND TRADEMARK OFFICE
CERTIFICATE OF CORRECTION

PATENT NO. : 6,254,352 B1
DATED : July 3, 2001
INVENTOR(S) : Atsusi Niizato et al.

It is certified that error appears in the above-identified patent and that said Letters Patent is hereby corrected as shown below:

<u>Title page,</u>
Item [75], Inventor, change "Ashikaga" to -- Tochigi --; "Oota" to -- Gunma --; "Oizumi-Machi" to -- Gunma --.

Signed and Sealed this

Twelfth Day of November, 2002

Attest:

JAMES E. ROGAN
*Attesting Officer*     *Director of the United States Patent and Trademark Office*